(12) United States Patent
Chopard

(10) Patent No.: US 7,419,644 B2
(45) Date of Patent: Sep. 2, 2008

(54) FLOW DIRECTING INSERT FOR A REACTOR CHAMBER AND A REACTOR

(75) Inventor: Fabrice Chopard, Saint Martin d'Heres (FR)

(73) Assignee: Alfa Laval Corporate AB, Lund (SE)

( * ) Notice: Subject to any disclaimer, the term of this patent is extended or adjusted under 35 U.S.C. 154(b) by 477 days.

(21) Appl. No.: 10/534,636

(22) PCT Filed: Nov. 7, 2003

(86) PCT No.: PCT/SE03/01719

§ 371 (c)(1),
(2), (4) Date: Nov. 11, 2005

(87) PCT Pub. No.: WO2004/045761

PCT Pub. Date: Jun. 3, 2004

(65) Prior Publication Data

US 2006/0159600 A1 Jul. 20, 2006

(30) Foreign Application Priority Data

Nov. 18, 2002 (SE) .................................. 0203395

(51) Int. Cl.
*B01J 8/04* (2006.01)
*B01D 50/00* (2006.01)
*F28D 7/00* (2006.01)

(52) U.S. Cl. ..................... 422/195; 422/129; 422/168; 422/171; 422/177; 422/190; 422/192; 422/200

(58) Field of Classification Search ................. 422/129, 422/168, 171, 177, 190, 192, 195, 198, 200
See application file for complete search history.

(56) References Cited

U.S. PATENT DOCUMENTS

| 6,132,689 A * | 10/2000 | Skala et al. ................. 422/193 |
| 6,451,268 B1 | 9/2002 | Erdman |
| 6,534,021 B1 * | 3/2003 | Maus ......................... 422/180 |

FOREIGN PATENT DOCUMENTS

| EP | 1091800 B1 | 4/2001 |
| WO | WO 9964146 A1 | 12/1999 |
| WO | WO 0194006 A2 | 12/2001 |

* cited by examiner

*Primary Examiner*—Walter D. Griffin
*Assistant Examiner*—Lessanework T Seifu
(74) *Attorney, Agent, or Firm*—Michaud-Duffy Group LLP

(57) ABSTRACT

A flow directing insert for a reactor chamber in a reactor may have a mainly square-shaped cross-section. The chamber has an inlet at one end of the chamber and an outlet at the other end of the chamber and at least one of the walls of the reactor chamber consists of a heat conductive material or of a membrane. The insert comprises a number of units arranged in rows, which units together with the walls of the chamber define a channel for a fluid. The channel extends from a first side of the chamber to a second side of the chamber and back again to the first side backwards and forwards a number of times. The units are arranged such that the fluid is forced to flow between the units in a serpentine path. A reactor comprises at least one reactor chamber containing a flow directing insert as described above.

10 Claims, 7 Drawing Sheets

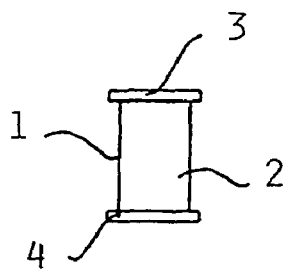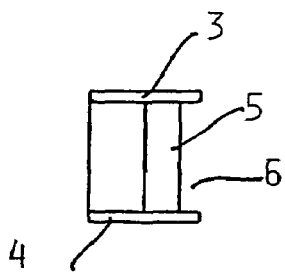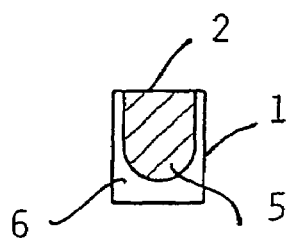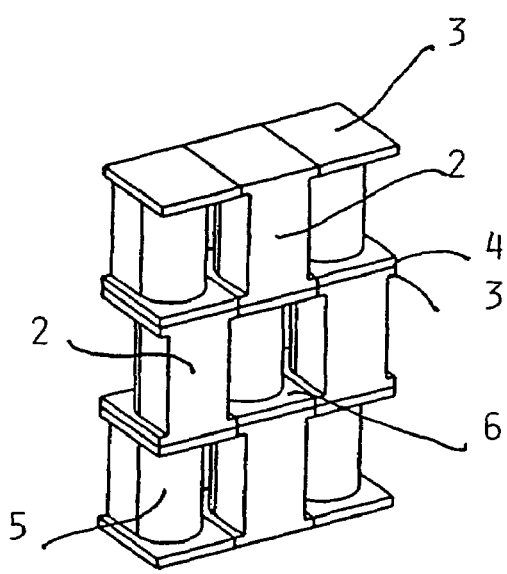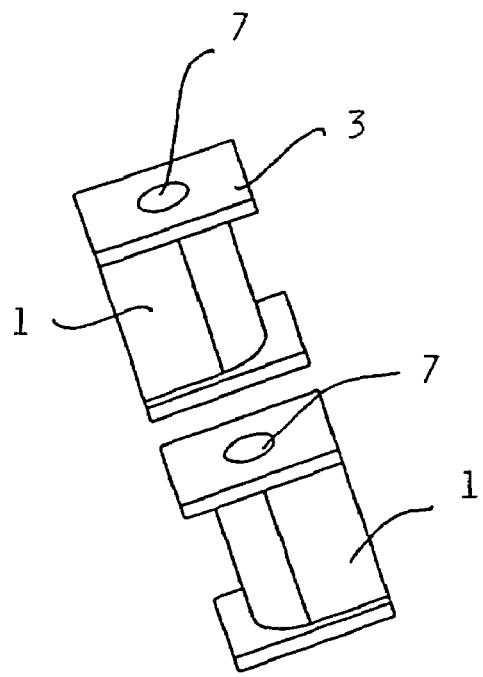

FLOW DIRECTING INSERT FOR A REACTOR CHAMBER AND A REACTOR

CROSS-REFERENCE TO RELATED APPLICATIONS

This application is entitled to the benefit of and incorporates by reference essential subject matter disclosed in International Application No. PCT/SE2003/001719 filed Nov. 7, 2003 and Swedish Patent Application No. 0203395-9 filed Nov. 18, 2002.

FIELD OF THE INVENTION

The present invention relates to a flow directing insert in a reactor chamber in a reactor, which reactor chamber has a mainly square-shaped cross-section and has an inlet at one corner of the chamber and an outlet at a another corner of the chamber. At least one of the wall of the reactor chamber consists of a solid heat conductive material or a membrane.

BACKGROUND OF THE INVENTION

Conventional reactors for carrying through different kinds of chemical reactions in a batch-wise manner have usually been in the shape of a vessel of a suitable dimension into which the reactants are poured and allowed to react during a predetermined reaction time. The vessel is usually provided with mixing means. If it is necessary to heat or cool the reactants the vessel may have been provided with a heating or cooling mantle or heating or cooling coils, which are immersed in the reactants. The heat transfer characteristics of such an arrangement is poor as well as the mixing.

Another type of reactor making it possible to carry through reactions continuously consists of tube reactors comprising tubes of suitable length, through which the reactants are made to flow. Such an arrangement gives possibility to control the holding time especially at turbulent conditions. If the reactants should be heated or cooled, the tube may be surrounded by a shell, through which heating or cooling medium is forced to flow.

Recently, plate reactors often called micro-reactors for carrying through catalytic reactions have been presented to the market. These micro reactors are often used in connection with fuel cells. Such a micro-reactor is described for example in EP 1 091 800, which shows a compact, catalytic reactor built up of piled textured plates forming reaction spaces and heat-bearing spaces. The texture may be in the form of channels aiming at a good distribution of the reaction liquid.

This type of reactors may also be used on a larger scale.

Flow directing inserts are known in many connections in order to divide a flow and to ensure that the flow direction is constantly changed. These inserts consist of different kinds of packing material, which is available in different materials and configurations. WO 01/94006 describes an example of a tube reactor of this kind with reaction tubes with modular packing that create turbulence in order to promote fluid flow through the packing material.

SUMMARY OF THE INVENTION

The present invention aims at providing a reactor chamber with a flow directing insert which makes it possible to get a precise hydrodynamic control of the flow conditions for the reactants which are to pass the reactor chamber. This goal is obtained in that the insert comprises a number of units arranged in rows, which units together with the walls of the chamber define a channel for a fluid, which channel extends from a first side of the chamber to a second side of the chamber and back again to the first side backwards and forwards a number of times and that the units are arranged such that the fluid is forced to flow between the units in a serpentine path. The insert according to the invention, which forces the fluid to change flow direction frequently, brings about turbulent flow conditions that efficiently prevent the occurrence of layers of fluid flowing at different flow rates and no stagnant zones are found. High mixing rates are obtained and a narrow distribution of the residence tine is obtained.

The fluid reactants passing the channel may be pure liquids, mixtures of liquids, liquids with particles or liquids with dissolved or free gas.

The insert may have a square-shaped form and a square-shaped cross-section. The length of each row in the insert may be considerably larger than the distance between two opposite walls in the reactor chamber. The mentioned opposite walls may one or both consist of a heat conductive material, which make it possible to let a cooling or heating fluid pass outside the channel. One of the walls or both may alternatively consist of a membrane of a suitable pore size making it possible to let a formed product or products pass the membrane. Combinations of walls of these kinds may also be possible.

The square-shaped insert may if so is desired be rolled to a tube or in a spiral. In such a case the walls of the reactor chamber must of course be given the same shape.

The units in the flow directing insert of the invention are designed such that each unit has one plane surface intended to abut one wall of the reactor chamber or the plane side of another unit in a tightening manner. The unit has an extension that is less than the distance between two opposite walls in the reactor chamber.

The flow directing insert is built up in such a way that each row of units is separated from an adjacent row of units by delimiting means, which abuts the walls of the reactor chamber in a tightening way. The reaction chamber may be arranged such that the fluid flows through the reaction chamber by the action of gravity, that is the inlet to the chamber may be situated above the outlet. It is of course also possible to make the fluid pass through the chamber driven by a pump, which means that the inlet and outlet to the chamber are situated on the same level.

The units in the flow directing insert have a side opposite to the plane surface with, for example a cylindrical shape. In this manner very favourable flow conditions are obtained.

In an embodiment of a flow directing insert according to the invention there is a connection between two adjacent rows of units in the reactor chamber, which is obtained in that there is an opening between one end of a row and a reactor wall and also between the next row of units and the same reactor wall. In this way the fluid may flow from one row to the other in the empty space created.

The flow directing insert may contain at least two units in at least two rows one adjacent the other which are arranged such that an opening in a cylindrical part of one unit cooperates with an opening in the delimiting means together with an opening in the cylindrical part of a second unit. In this manner, a passage is formed that extends through a part of the insert or through the whole insert. Such passages make it possible to create a connection between an inlet at one end of the reactor chamber and the flow of fluid anywhere in the reactor chamber. The passages may be used for injecting a liquid or gas reactant into the flow of fluid. They may also be used for taking samples or measuring, for example, temperature or pressure. If so desired a cooling or heating medium may be conducted through the formed passages.

The flow directing insert containing a desired number of rows and delimiting means can be manufactured in one piece.

Depending on the desired material, the insert may for example be manufactured by moulding, pressing, milling or by casting.

The flow directing insert containing a number of units and limits may alternatively be produced in column shaped pieces, which together form the insert. This may be necessary if the units have a radiused form close to the plane surface.

One especially suitable material for manufacturing the insert consists of polyetheretherketone, PEEK. Other materials may be carbon, glass, metal or combination thereof.

BRIEF DESCRIPTION OF THE DRAWINGS

The flow controlling insert according to the invention will be further described with reference to the attached drawings which show two examples of embodiments of the flow directing insert. These embodiments have been chosen as examples only.

FIGS. 1-3 show different views of a single unit with limits intended to be a part of an insert.

FIG. 4 is a perspective view of a number of units compiled to form a part of an insert.

FIG. 5 is a perspective view of two units provided with openings intended to be arranged in two adjacent rows.

DETAILED DESCRIPTION OF THE PREFERRED EMBODIMENTS

Figure 6:
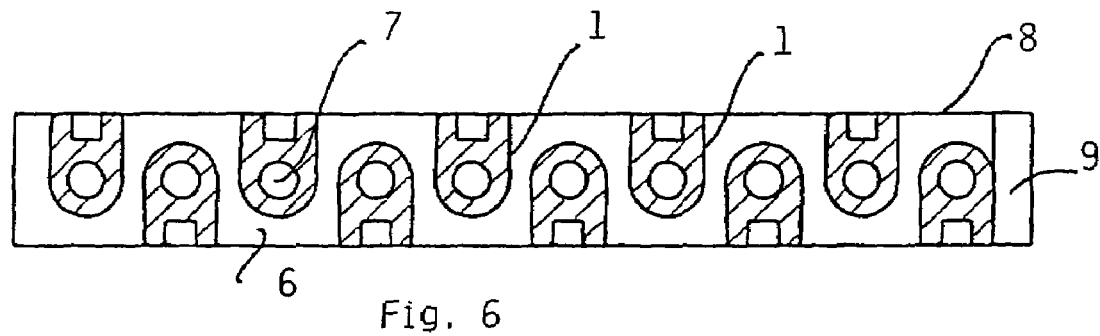
FIG. 6 shows a cross-section of a row of units provided with openings in the cylindrical part of the unit.

In FIG. 1 there is shown a single unit 1 seen from one side, which unit 1 together with similar units arranged in rows form an insert for a reactor chamber. The unit 1 has a plane surface 2 and upper and lower square-shaped limits 3, 4.

The unit 1 has a cylindrical part 5 on its side opposite to the plane surface as may be seen in FIG. 2, which shows a cross-section of the unit.

In FIG. 3 the unit 1 is seen from the side. As may be seen in FIG. 2 and 3 there is formed a free space 6 within the unit limited by the extension of the limits 3 and 4. This free space is intended for the fluid, which shall pass the reactor chamber.

In FIG. 4 there is shown how nine units 1 are arranged in relation to each other in order to form the insert for the reactor chamber. As may be seen in FIG. 4 the nine units shown in the figure are arranged such that the plane surface of the first and third units in every row are turned at the same side, whereas the second unit in each row is turned 180° in relation to the first and third unit. In this way the plane surfaces of the units define an area (surface), which together with the walls of the reactor chamber (not shown here) form a meander shaped channel for the fluid. The fluid flows through the free spaces 6 between the units and between the cylindrical part 5 of the units and the walls of the reaction chamber. In order to bring the fluid to flow in the formed channel it is of course necessary that the plane surface of the units abuts the adjacent wall such that no fluid may by-pass the channel. The upper and lower limits, 3 and 4 respectively, of the units 1 define alone and together delimiting means between the rows.

In these drawings the rows of the insert are built up of single units. If so is desired it is of course possible to build up an insert containing units, where two units turn their plane surfaces against each other. This gives an efficient distribution of the flow at the cost of the possibility to accurately control the residence time distribution in the chamber.

In FIG. 5 there is shown two units intended to be arranged in rows adjacent to each other. Both these units have an opening 7 in the cylindrical part of the unit that extends through the unit from the upper 3 to the lower 4 limit. With such an arrangement it is possible to connect an inlet at one end of the reactor chamber such that a flow of injected fluid is added to a flow of the first fluid at any desired point in the reactor chamber. The connection is established in that a unit with an opening 7 also has an opening anywhere in the surface of the cylindrical part of the unit, which two openings are connected somewhere in the unit. It is also possible to have a number of units with openings in a number of adjacent rows such that there is formed a passage, which extends all the way through the insert.

In FIG. 6 there is shown a cross-section of a number of units 1 provided with openings 7. The individual limits 4 of the units form together the delimiting means 8. At the right end of the figure there is a cavity 9 in the delimiting means 8. This cavity 9 makes it possible for the fluid to flow from one row of units to an adjacent row of units.

Figure 7:
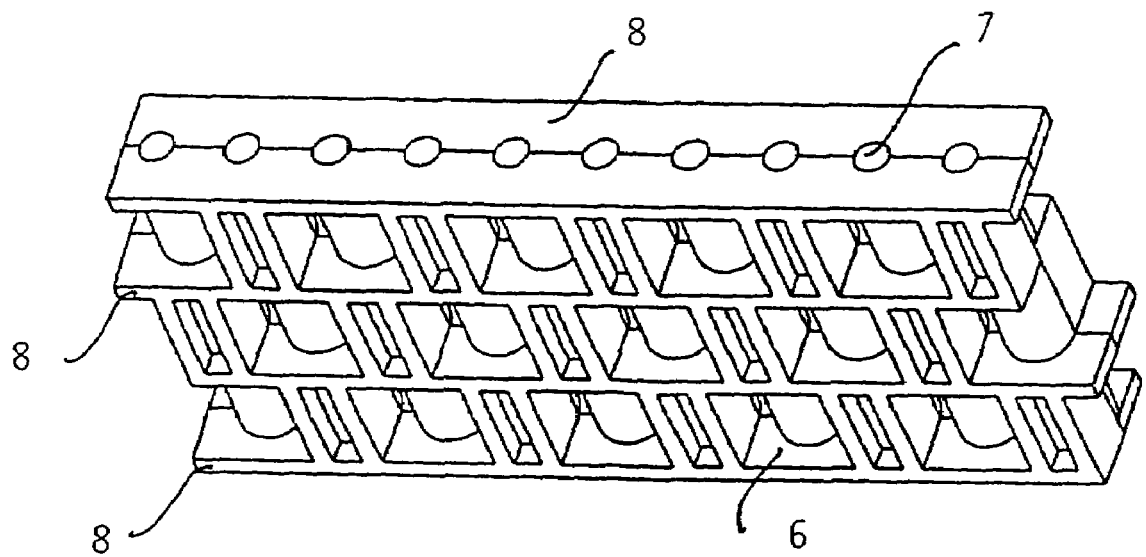
FIG. 7 is a perspective view of three rows of units with openings.

FIG. 7 shows three rows of units provided with openings 7. As may be seen in the drawing the uppermost delimiting means 8 extends somewhat longer to the right than the next delimiting means. This space corresponds to the cavity 9 shown in FIG. 6. A fluid, which is to flow through the reactor chamber (no walls are shown in this figure), enters the reaction chamber through an inlet (not shown) situated in close vicinity to the left end of the uppermost row of units. The fluid then flows in a serpentine path in the free space 6 between the units, until it reaches the right end of the uppermost row. Due to the cavity 9 the fluid may then pass to the next row and flow through the free space between the units from right to left. As may be seen in the figure there is a corresponding cavity in the third delimiting means 8, giving the fluid the possibility to enter the third row of units. In this drawing the insert is shown standing. Of course it is just as possible that the insert is arranged in a reactor chamber, which is horizontal.

Figure 8:
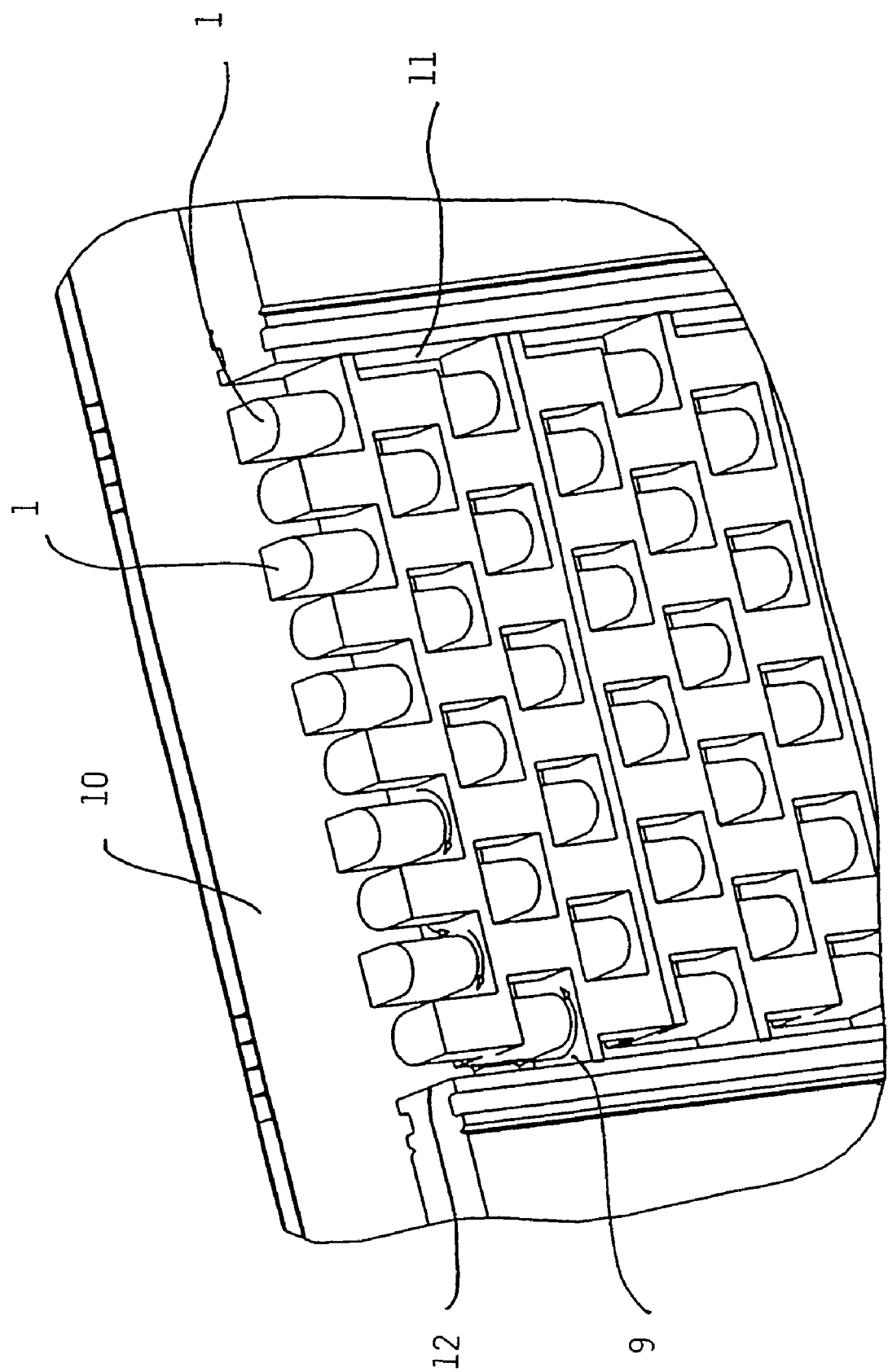
FIG. 8 is a perspective view of a section of an insert located in a reactor chamber.

In FIG. 8 it is shown how an insert comprising a block of units 1 moulded in one piece may be arranged in a reactor chamber. The reactor chamber surrounds a space in the shape of an elongated square. In the drawing, which only shows a small section of the reactor chamber, there is shown the farther wall 10 of the chamber and the side walls 11, 12. The front wall of the reactor chamber has been omitted for sake of clarity. In the drawing it is seen how the fluid arrives from the right end of the chamber and flows in a serpentine path in the channel, which is defined by the units and the walls of the chamber. The cavity 9 formed between the insert and the side wall 12 makes it possible for the fluid to pass on to the adjacent lower row.

Figure 9:
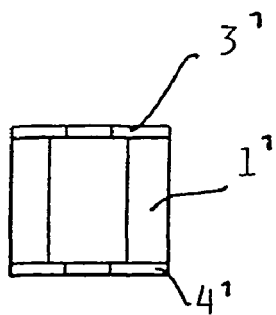
FIGS. 9-11 show different views of another embodiment of a single unit intended to be a part of an insert.
Figure 10:
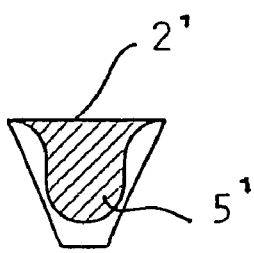

In FIG. 9 there is shown an embodiment of a unit with slightly different form giving another kind of insert. The unit $1^1$ is seen from one side and has also upper and lower limits $3^1$ and $4^1$. In FIG. 10 there is shown a cross-section of the unit $1^1$.

Figure 11:
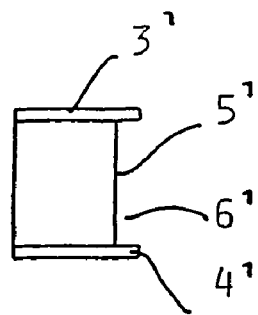

As may be seen in the drawing the unit $1^1$ has a plane surface $2^1$ and a cylindrical part $5^1$. There is a softly bent or radiused change-over from the cylindrical part to the plane part. The upper and lower limits $3^1$ and $4^1$ have the shape of a truncated triangle with two parallel sides. As may be seen in FIG. 11 there is a space $6^1$ in front of the cylindrical part $5^1$ of the unit.

Figure 12:
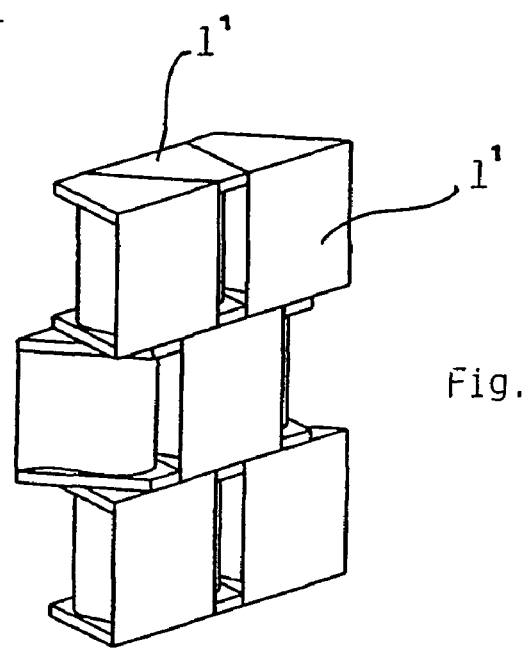
FIG. 12 is a perspective view of how units are combined to be a part of an insert.
Figure 13:
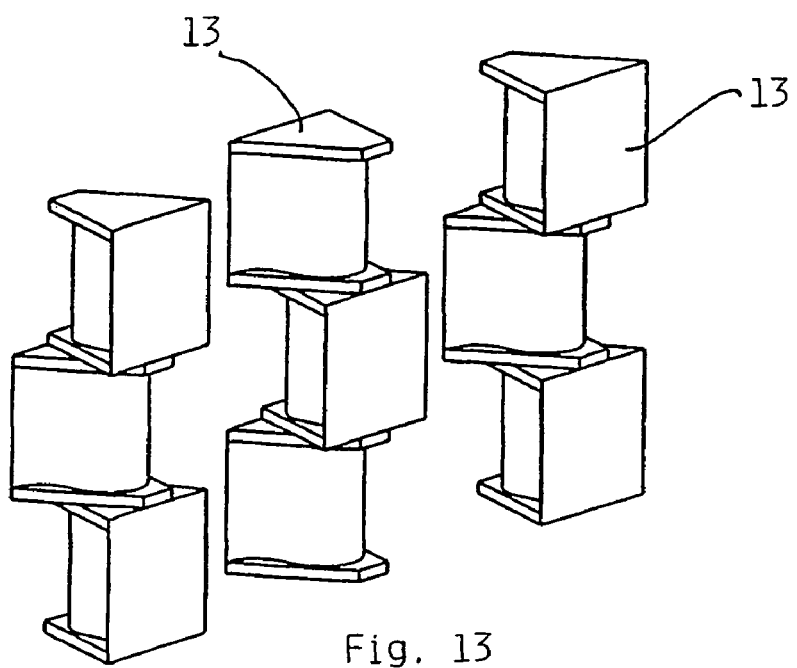
FIG. 13 is a perspective view of how these units may be manufactured in the form of columns.

FIG. 12 illustrates how the units may be arranged in order to form a part of the insert intended to be used in the reactor chamber, every second unit being turned 180° in relation to the other unit. The part of the insert shown in FIG. 12 may, as is shown in FIG. 13, be built up of columns 13, which are manufactured in one piece comprising a desired number of units.

Figure 14:
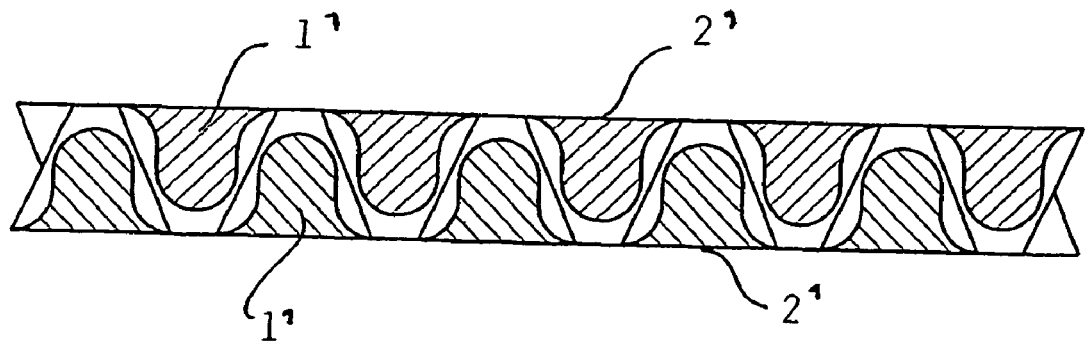
FIG. 14 shows a cross-section of a row of units.

In FIG. 14 there is shown a cross-section of a number of units $1^1$ in a row. The plane surfaces $2^1$ of the units are intended to abut the walls of the reactor chamber in a tightening manner. In the drawing it is seen how the softly bent parts of the units $1^1$ close to the plane surface $2^1$ together with the cylindrical part of the units form a serpentine channel.

Figure 15:
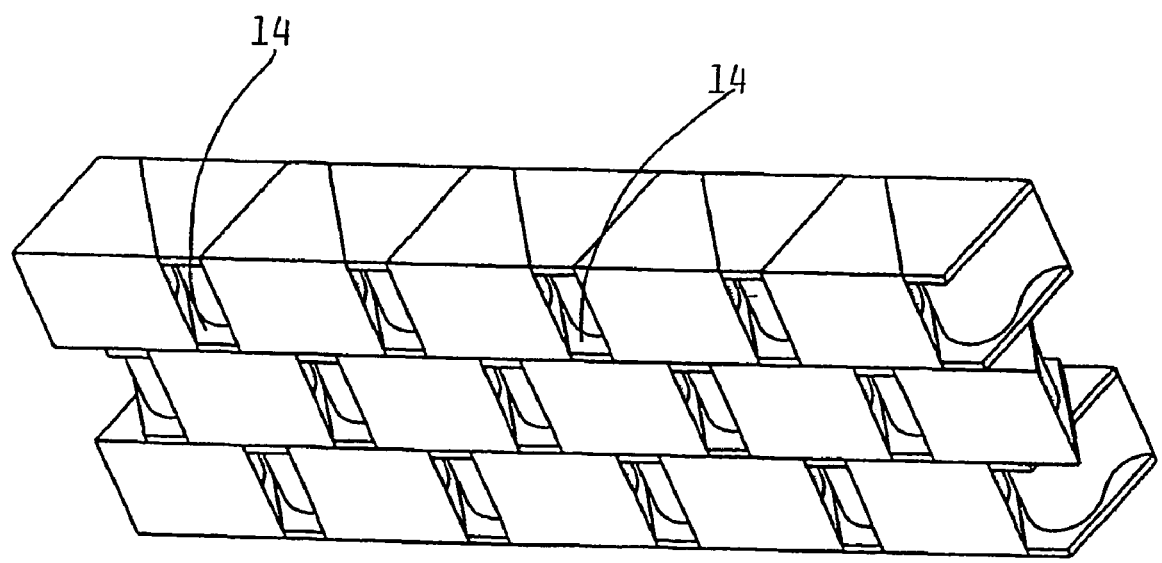
FIG. 15 shows how ten units in three rows form a part of an insert.

In FIG. 15 there is shown a perspective view of three rows of units with ten units in each. This figure illustrates how the upper and lower limits of the units co-operate to form plane upper and lower surfaces which form the delimiting means separating the rows. It is also seen how the plane surfaces $2^1$ form a plane area with small openings 14. The walls of the reaction chamber should abut on this plane area (surface) in a tightening manner and form a limitation for the channel, which is obtained between the units.

Figure 16:
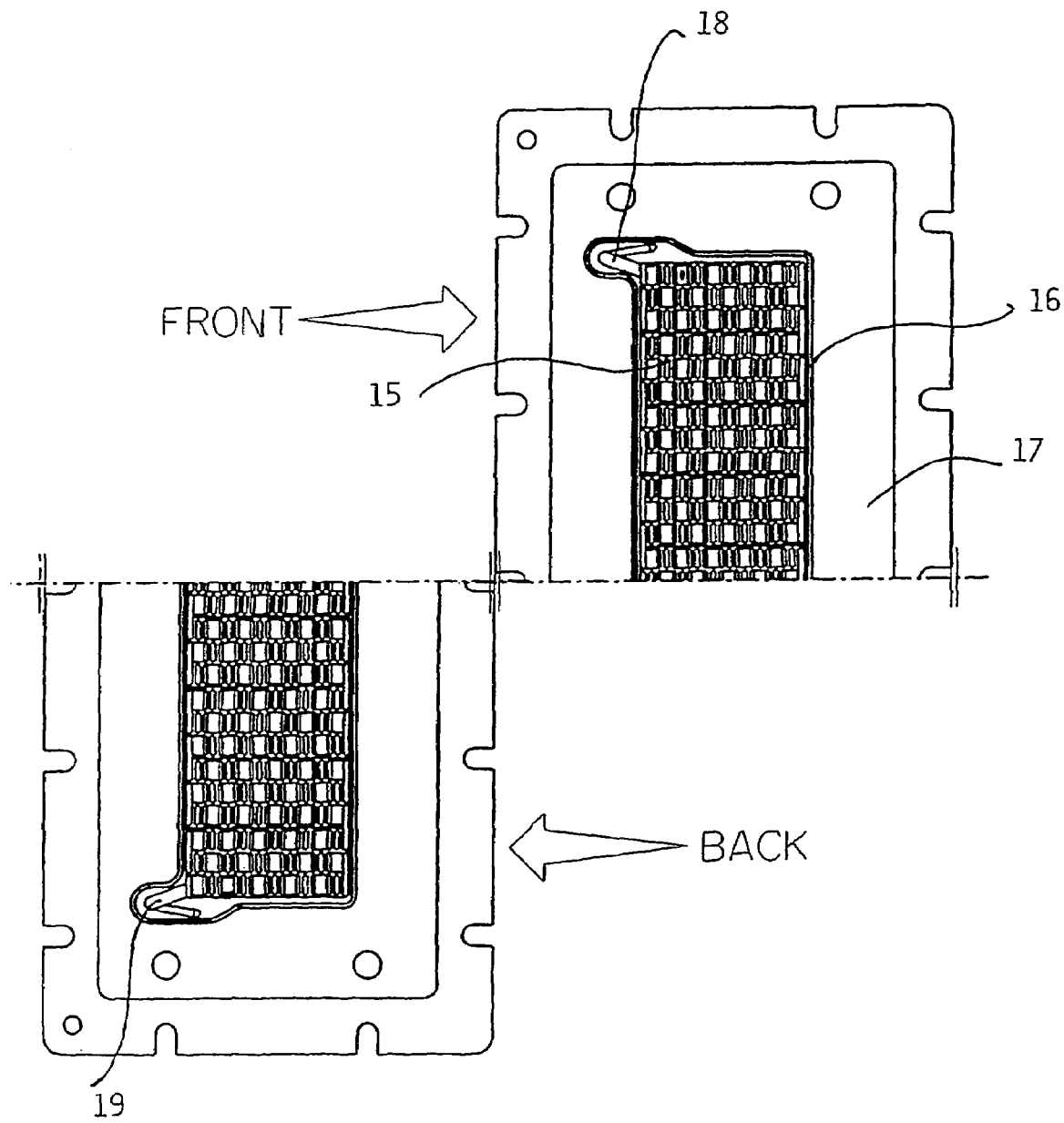
FIG. 16 shows an insert located in a reaction chamber in a plate seen both from the front and from the back.

In FIG. 16 the insert 15 is shown within a reactor chamber 16. The reactor chamber is situated in a square-shaped opening in a rectangular plate 17. The reactor chamber is limited by the edges of the square-shaped opening and of thin plates or membranes situated behind and in front of the plate 17. (The thin plates or membranes are not shown in FIG. 16.) At one end of the chamber there is an inlet 18 for the fluid, which shall pass the reactor chamber and at another end of the reactor chamber there is an outlet 19 for the fluid.

Figure 17:
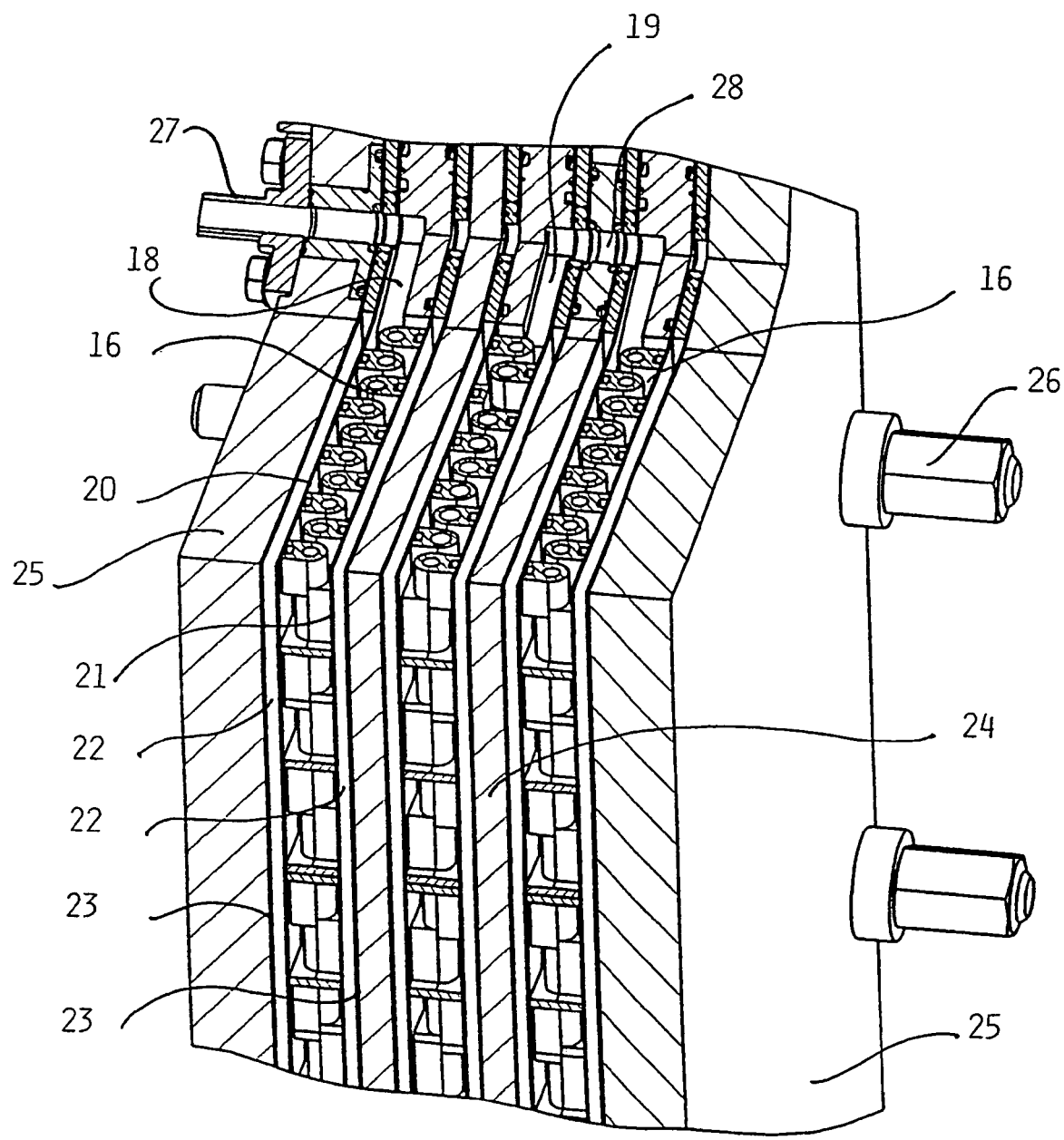
FIG. 17 is a perspective view of a part of an example of a reactor with a reactor chamber containing inserts according to the invention.

A part of a reactor containing three reactor chambers 16 is shown in FIG. 17. The walls 20, 21 surrounding the reactor chambers consist in this embodiment of thin plates of a heat conductive material. Membranes may, if so is suitable, be used instead of thin plates on one or both sides of the reactor chamber. At both sides of the reactor chamber there are channels 22 through which a cooling or heating fluid may flow. The channels 22 are on their other side delimited by walls 23. Between the channels for cooling or heating fluid are transition plates 24. The reaction chambers 16, the channels for cooling or heating medium and the transition plates are surrounded on both sides by frame plates 25 and the package is held together by bolts 26. There is an inlet pipe 27 at one end of the reactor and a corresponding hole in the frame plates 25 and the walls surrounding the channels for cooling or heating medium. The fluid, which shall pass the reactor chamber, enters through the inlet pipe 27 and the mentioned holes and arrives to the inlet 18 of the reactor chamber 16.

The fluid then flows in a serpentine path between the units in the first uppermost row, then through the next row and further on until all the rows in the first reaction chamber have been passed. The fluid then passes holes in the lower end of the reactor (not shown) and enters the second reactor chamber. In this the fluid is forced to flow from one side of the reactor chamber to the other side between the units in row after row upwards until it reaches the row on the top. There is outlet 19 from the reactor chamber through which the fluid may pass on through the holes in the walls 21, 23 and through an opening 28 in the transition plate 24. In this embodiment the reactor chambers are connected in series. Of course it is also possible to connect the reactor chambers in parallel if so is desired.

Instead of having heating or cooling channels on both sides of a reactor chamber it is also possible to separate two reactor chambers from each other by a membrane. With such an arrangement with a heating or cooling channel, a reactor chamber, a membrane, a reactor chamber and a heating or cooling channel arranged beside each other a first reaction may take place in the first reaction chamber and one component, originally present or formed during the reaction, may pass the membrane for a further reaction or heating or cooling.

In the embodiments shown in the drawings all the units in an insert are of the same size and shape. Of course it is possible within the scope of the invention to use units of a smaller or thicker extension in one or a number of rows, or in only a part of a row. The upper or lower limits may be made thicker, which of course alters the size of the channel. Such a reduction of the size of the channel may bring about an increase in the flow rate, which may be of advantage.

What is claimed is:

1. A flow directing insert for a reactor chamber in a reactor, the reactor chamber comprising an inlet at one end of the chamber and an outlet at another end of the chamber, at least one wall of the reactor chamber including a heat conductive material or a membrane; and wherein the insert comprises a plurality of units arranged in rows, the units cooperating with walls defined by the chamber to form a channel for a fluid, the channel extending from a first side of the chamber to a second side of the chamber and back again to the first side back and forth a number of times, and wherein the units are arranged such that the fluid is forced to flow therebetween in a serpentine path.

2. A flow directing insert according to claim 1, wherein each of the units defines at least one plane surface that abuts one wall of the reactor chamber or the plane surface of another unit and has an extension that is less than the distance between opposite walls of the reactor chamber.

3. A flow directing insert according to claim 1, wherein each row of units is separated from the next row of units by delimiting means extending between and abutting the walls of the reactor chamber in a tightening manner.

4. A flow directing insert according to claim 1, wherein a side of the unit generally opposite to the plane surface has a softly bent shape.

5. A flow directing insert according to claim 1, wherein a connection between two adjacent rows of units in the reactor chamber is defined by an opening between one end of a row and a reactor side and between the next row of units and the reactor side, such that the fluid may flow from one row to the other in the created empty space.

6. A flow directing insert according to claim 1, wherein at least two units in at least two rows one adjacent the other are arranged such that an opening in one unit cooperates with an opening in the delimiting means together with an opening in the second unit to create passages between the inlet at one end of the reactor chamber and a flow path in the reactor chamber or through said chamber.

7. A flow directing insert according to claim 1, wherein a number of rows of units and the delimiting means are produced in one piece.

8. A flow directing insert according to claim 1, wherein a number of units and limits defined thereby are produced in one piece as a column.

9. A flow directing insert according to claim 1, wherein the insert is manufactured in at least one of polyetheretherketone (PEEK), carbon, glass and metal.

10. A flow directing insert according to claim 4, wherein the softly bent shape is cylindrical.

* * * * *